United States Patent [19]
Geldmacher

[11] Patent Number: 5,593,583
[45] Date of Patent: Jan. 14, 1997

[54] FILTER FOR CONTINUOUS FILTRATION OF LIQUIDS CONTAINING SOLIDS IN A CLOSED CYLINDRICAL VESSEL

[76] Inventor: Joachim Geldmacher, Heidnuechelsweg 20, 51588 Nuembrecht, Germany

[21] Appl. No.: 343,751

[22] Filed: Nov. 22, 1994

[30]     Foreign Application Priority Data

Nov. 30, 1993 [DE] Germany ............................ 43 40 691.2
Aug. 4, 1994  [DE] Germany ............................ 44 27 552.8

[51] Int. Cl.$^6$ .......................... B01D 33/23; B01D 33/46
[52] U.S. Cl. ................. 210/331; 210/333.1; 210/334; 210/347; 210/393; 210/396; 210/398; 210/486; 210/490; 210/510.1
[58] Field of Search ................... 210/232, 327, 210/331, 332, 334, 346, 393, 394, 396, 398, 408, 486, 321.84, 333.01, 333.1, 347, 490, 321.68, 510.1

[56]          References Cited

U.S. PATENT DOCUMENTS 3,262,577  7/1966  Tuit ............................................. 210/487
5,330,645  7/1994  Geldmacher ............................. 210/327

*Primary Examiner*—Matthew O. Savage
*Attorney, Agent, or Firm*—McAulay Fisher Nissen Goldberg & Kiel, LLP

[57]             ABSTRACT

Filter for continuous filtration of liquids containing solids in a closed cylindrical vessel with a pressure difference between the liquid to be filtered and the filtrate, with disks which are formed by hollow filter sectors and supported at a distance from one another on a driven horizontal hollow shaft normal to the shaft, with filter beds on both sides of every filter sector and a hollow space located between the latter allowing the filtrate to flow out through the hollow shaft, and with devices which are movably pressed against on both sides of every filter disk for removing and discharging solids from the filter beds forming the outer sides of the filter disks and for cleaning these filter beds, wherein every device for removing and discharging solids from and cleaning the filter beds is formed by a closed hollow box unit which is completely surrounded by the liquid to be filtered and has a plurality of chambers which are separated from one another, wherein every chamber has at least one inlet gap comprehending the entire radius of the filter disk and at least one of the chambers contacts the respective filter bed so as to be sealed relative to it.

14 Claims, 8 Drawing Sheets

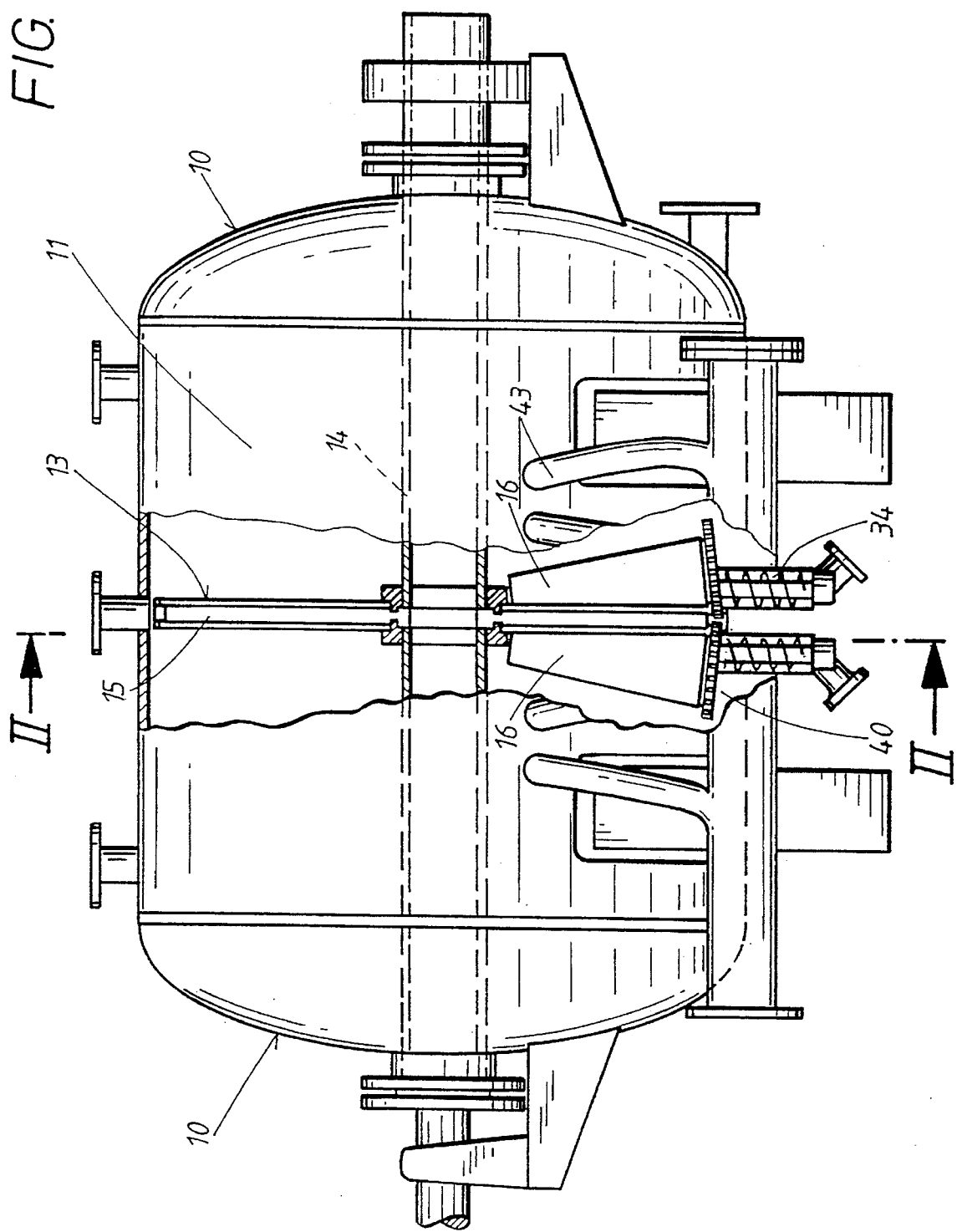

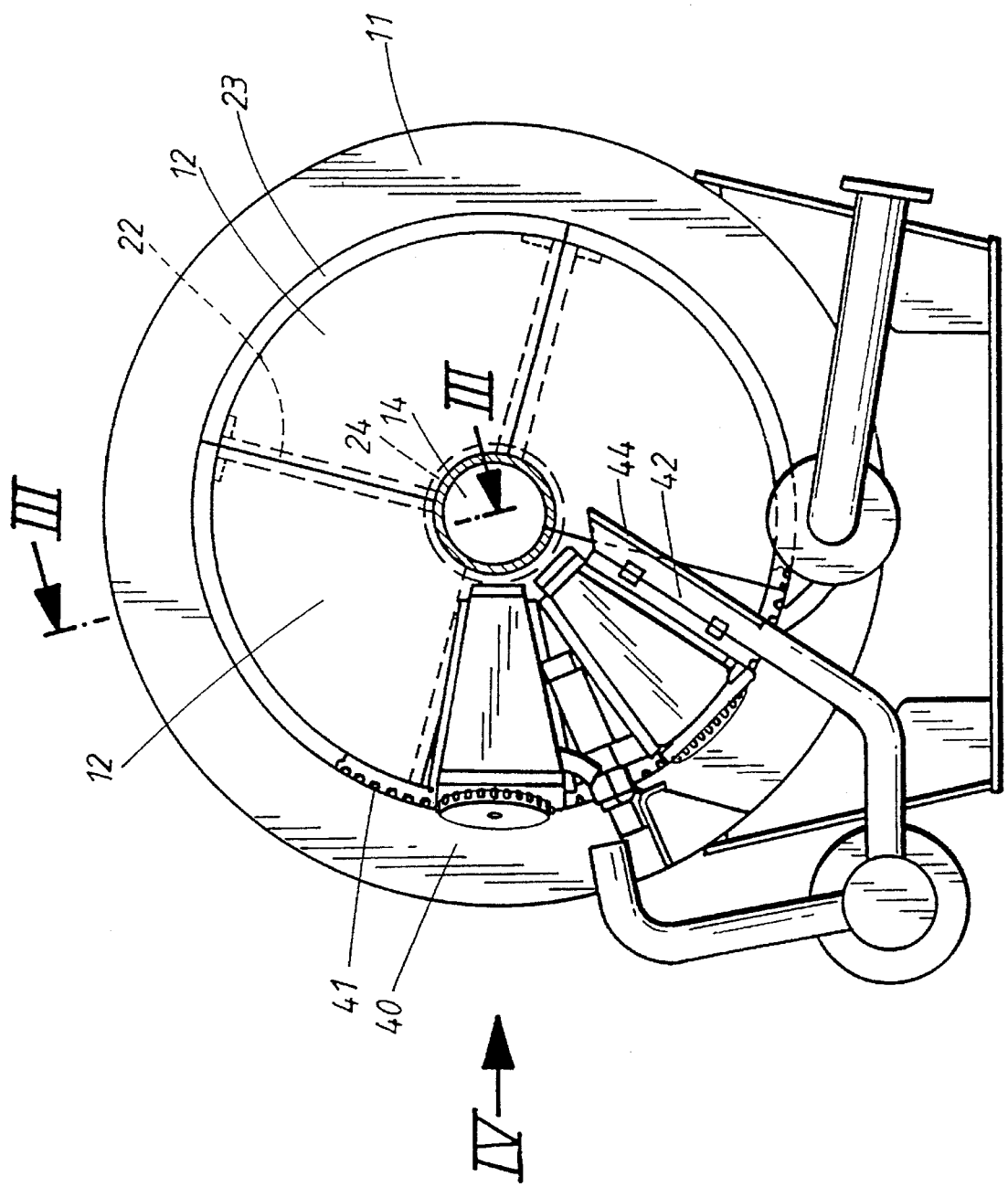

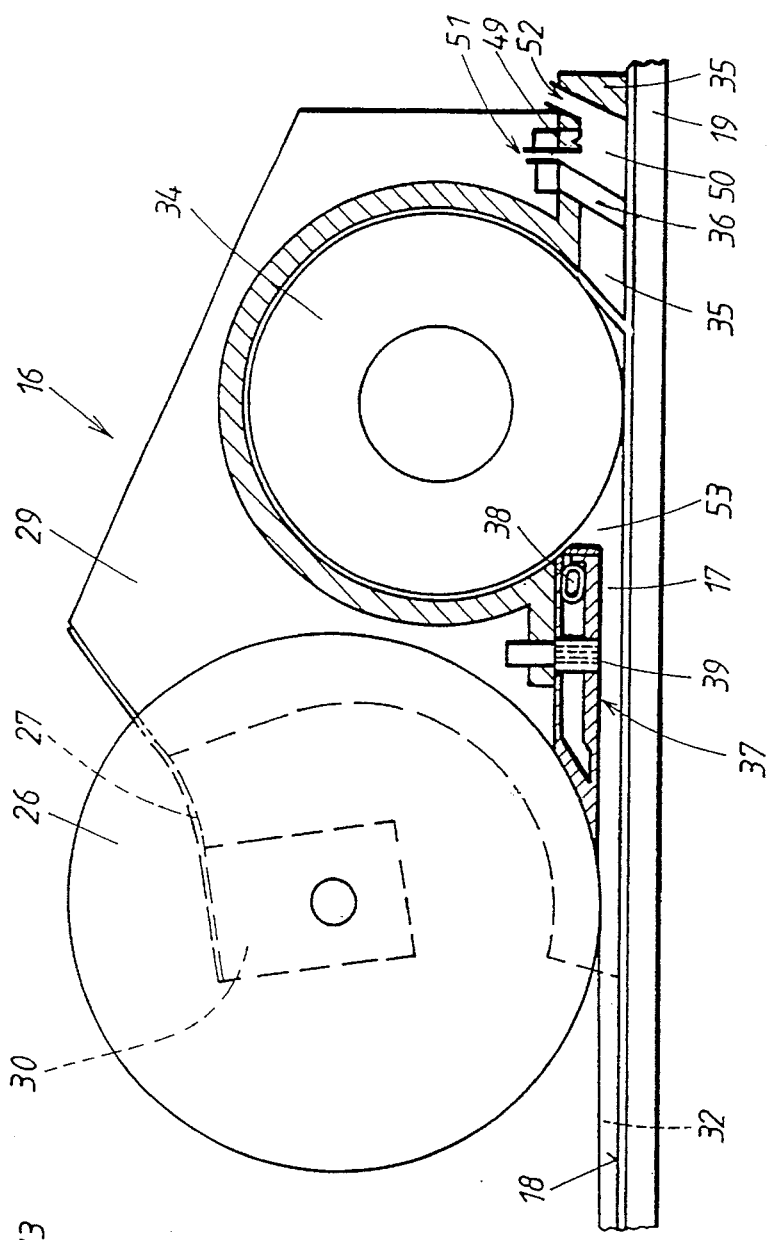

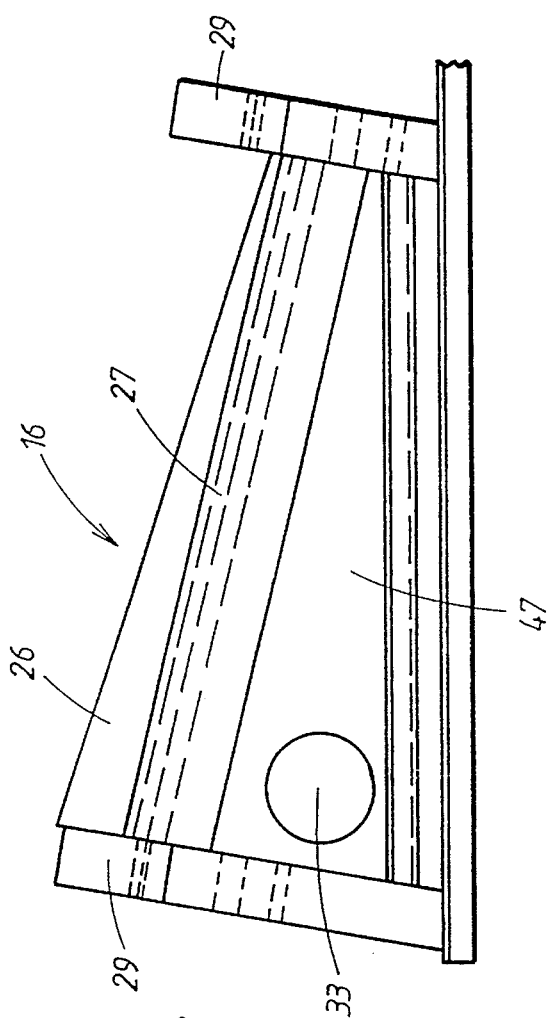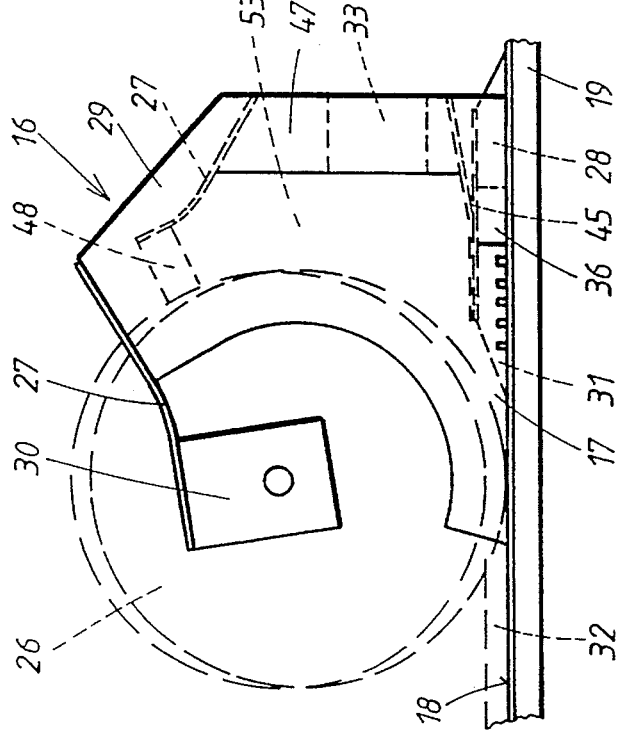

FILTER FOR CONTINUOUS FILTRATION OF LIQUIDS CONTAINING SOLIDS IN A CLOSED CYLINDRICAL VESSEL

BACKGROUND OF THE INVENTION a) Field of the Invention

The invention is directed to a filter for continuous filtration of liquids containing solids in a closed cylindrical vessel with a pressure difference between the liquid to be filtered and the filtrate. The filter uses disks formed by hollow filter sectors, filter beds on both sides of every filter sector and devices movably pressed on both sides of every filter disk for removing and discharging solids from the filter beds forming the outer sides of the filter disks and for cleaning the filter beds. Every such device is formed by a closed hollow box unit which is completely surrounded by the liquid to be filtered.

b) Description of the Related Art

This filter, which is known from DE-PS 42 25 818, can achieve a relatively high continuous output since, when it is used as directed, the filter disks are completely immersed in the liquid to be filtered so as to make use of the entire filter surface of the filter disks. Although the cylindrical vessel holding the filter disks is completely filled with the liquid to be filtered, removal and discharge of solids from the filter beds forming the outer sides of the filter disks is only slightly impaired because the devices for removal and discharge of solids from the filter beds are formed by closed hollow boxes which are completely surrounded by the liquid to be filtered. The boxes contact the respective filter bed so as to be sealed relative thereto and have, in the contacting region, at least one inlet gap comprehending the entire radius of the filter disk. The solids collecting at the outer sides of the filter can accordingly be removed and discharged.

DE-AS 10 57 071 discloses a disk filter for filtration and for pressing out the filter cake in which filter plates which are divided into individual cells in a conventional manner are covered on one side with filter medium. The covered sides of two plates face one another, and the disks are connected, via a flexible pipeline, with the pipelines in the axle which open into a control member in a known manner. Further, the plates are flexibly arranged on the axle and are pressed together by adjustable pressing rollers at a location lying outside the trough. Accordingly, rollers which can be adjusted under pressure are known from this reference.

DE-PS 638 001 discloses a device for removing filter cakes from rotary filters. Accordingly, removal rollers for rotary disk filters are known from this reference.

Finally, U.S. Pat. No. 30 80 064 discloses a filter for continuous filtration of liquids containing solids. In particular, spring-loaded scrapers are known from this reference.

OBJECT AND SUMMARY OF THE INVENTION

The primary object of the present invention is to further improve the rotary disk filter of the type mentioned above so that it can be handled in a simple manner, has large filter surfaces with high inlet pressure and a small overall size and ensures the sealing of at least one chamber of the box unit relative to the filter beds as well as the sealing of the microporous filter beds relative to the hollow spaces of the disks. According to the invention, outer sides of the filter disk are formed in a known manner from plane, pressure-tight filter plates which have microporous surfaces similar to membrane filters and are provided with inner reciprocal supports. In this way, large-area filter surfaces which are easy to handle are formed in a simple manner. Movable removal vessels are pressed against the outer sides of the filter disks. In this way, solids can be removed from the outer side of the filter disk. In so doing, scrapers which are supported so as to be movable at the outlet side and sealing strips which are pressed against resiliently are provided in order that the removal vessel can be reliably delimited relative to the filtrate. The scrapers can have a sharp front edge. However, in another construction the edge can also be blunt.

The box units for holding at least one chamber which is sealed relative to the filter beds extend radially along the entire filter bed of every disk and have continuous seals in the vicinity of the shaft along every chamber of the box unit at the outer edge of the disk as well as at the inner edge of the filter bed. An inlet gap for solids is formed between these lateral seals of the box unit and the filter bed and upper wall of the box unit, these solids being transported into the adjoining solids collecting space by the rotation of the disk. At the end of the solids collecting space, solids are lifted up by a scraper firmly contacting the filter bed and can be sucked out through a suction opening. The primary precleaned filter bed can be further cleaned in an adjoining backwash chamber by vacuum action accompanied by back-suction of the filtrate from the hollow space of the disks. As the disks continue to rotate, the cleaning of the filter plate bed can be further improved by the action of water spray nozzles, the spray chamber being connected with the outer atmosphere by a pipe connection. A vacuum duct is drawn along the ventilated spray chamber so that a particularly good sealing is achieved and leakage water is sucked out.

At the end of the box unit, a sealing strip lies flat against the cleaned filter bed and prevents solids-containing liquids under pressure from penetrating into the box unit from the cylindrical vessel. The rinse water from the spray chamber is guided out of the pressure vessel through a line. Each chamber of the box unit can have a scraper edge on the outlet side so that detached solids can be carried off safely.

The plane, pressure-tight filter plate can be produced from a sintered plate of polymeric plastic with a fineness of 0.5 to 200 microns. A plane, pressure-tight filter plate which can comprise coarse supporting body material in the form of polymeric plastic is dependably provided by this sintered plate with a filter fineness of 0.5 to 20 microns. A reliable filtration is accordingly ensured and the filter plate has a relatively long service life.

The plane, pressure-tight filter plate of polymeric plastic can be formed by a sintered microporous surface which is similar to a membrane filter and has a fineness of 0.5 to 200 microns with coarse supporting body material having a filter fineness of 0.5 to 200 microns. Accordingly, the filter plate is reliably tight against pressure, has a plane surface and can be supported by coarse supporting body material, and a filter fineness of 0.5 to 200 microns can be achieved.

The plane, pressure-tight filter plate can be formed by a sintered plate which is sintered from metal powder chips and has a fineness of 0.5 to 20 microns. Accordingly, the filter plate sintered from metal powder chips can likewise be provided with a plane surface in a simple manner and can be pressure-tight and can be produced from a coarse supporting body material with a filter fineness of 0.5 to 200 microns.

The plane, pressure-tight filter plate can have at its outer side at least one additional filter layer which is similar to a membrane filter, is applied by ceramic metallurgy and preferably has a filter fineness between 0.5 and 50 microns.

The filter is accordingly improved in a simple manner since it now has at least two layers and an additional sintered filter layer similar to a membrane filter, preferably with a filter fineness of 0.5 to 50 microns.

The plane, pressure-tight filter plate can have at the outer side at least one additional microporous filter layer of polymeric plastic similar to a membrane filter and preferably with a filter fineness between 0.5 and 50 microns. This additional, microporous filter layer of polymeric plastic likewise provides a plane, pressure-tight filter plate with high strength.

The plane, pressure-tight filter plate can be produced from composite-layer sieves with coarse supporting body material and a filter layer similar to a membrane filter which is fixedly connected metallically by weld spot tacking and preferably has a filter fineness between 0.5 and 50 microns. A plane, pressure-tight multiple-layer filter plate having a filter layer which is fixedly connected metallically and having the required filter fineness can likewise be provided in a simple and reliable manner by these multiple-layer sieves.

The supports of the multiple-layer filter plate can be formed over the entire surface area within the filtrate outlet hollow space of the disk between two inner sides of the filter plates by pressure-tight spiral springs which are preferably arranged in the circumferential direction of the disks. The filter plates are supported in a simple and dependable manner by these spiral springs which are inserted into the hollow spaces of the disks so as to prevent the filter plates from bending inward.

The filter plates can be closed in a pressure-tight manner relative to the carriers, covers and shaft receiving rings of the disk sectors in that they are mechanically pressed into U-shaped sealing grooves by pressing strips. The filter plates are accordingly held and sealed relative to the hollow spaces in a simple and reliable manner.

Grooves which are preferably located opposite one another and form a square can be incorporated in the pressing surfaces between the grooves and pressing strips, rubber-elastic O-seals being deformed in these grooves under pressure. Accordingly, the filter plates are provided in a simple manner with square grooves in which rubber-elastic O-seals are inserted to achieve the required sealing.

The mechanical pressing can be applied externally around every disk by a clamping ring. Accordingly, mechanical pressing can be effected in a simple manner by a clamping ring arranged on the disk of the filter.

The holding vessels which extend radially along the disk surfaces so as to be pressed against the latter can have resiliently supported sealing elements. The required sealing of the holding vessel can accordingly be achieved by means of these springing-resilient sealing elements in a simple manner.

The springing-resilient bearings for the conical roller, scraper and sealing strips can be constructed as leaf springs. Accordingly, resilient bearings for the conical roller, scraper and sealing strips can be provided in a simple and reliable manner by means of the leaf springs.

The scraper can be supported at a leaf spring and the sealing strips on the outlet side can be supported at the scraper by a second leaf spring. Accordingly, the scraper and the sealing strip on the outlet side can be supported in a simple manner by leaf springs and the sealing strip on the outlet side is held at the scraper.

The contact pressure force of the removal boxes relative to the filter plates can be adjusted by a pressing device. Accordingly, the contact pressure force of the removal boxes can be reliably adjusted by a pressing device.

A worm conveyor or conveyor screw for discharging solids inside the removal box can be arranged in proximity to and parallel to the surface of the filter plates. Accordingly, solids can be carried off in a reliable manner by this conveyor screw which occupies only limited space.

The conical sealing and removing rollers can be aligned by very thick and very soft rubber-elastic covers which are highly deformable. Accordingly, a strong, resilient contact pressure and sealing can be achieved.

A pressing shoe for pressing liquid out of the filter cake can be arranged between the conical sealing and removing roller and the discharge screw. Accordingly, solids are pressed out by this pressing shoe in a simple manner so that only a very small amount of liquid remains in the solids after processing with the pressing shoe.

The pressing shoe can be supported on the inlet side so as to be swivelable and can preferably be pressed against the cake on the outlet side by a compressed-air hose. Accordingly, the pressing shoe can be pressed against the solids in a simple manner and the required pressing can be brought about by the compressed-air hose.

At least one row of openings can be arranged in the pressing shoe in such a way that the entire width of the filter cake can be additionally dried by injecting compressed air. Accordingly, the solids cake can be further dried in a simple manner by blowing compressed air into the openings.

The liquid can preferably flow in so as to be directed approximately parallel along the surface of the disk from a slotted pipe which is supported at the removal vessel. A simple and reliable cleaning of the layer plate can be effected by introducing liquid in this way.

The box unit can have a slanting front wall on the inlet side with a gap opening leading to the adjoining solids collecting space from which solids can be discharged by a conveyor screw. In this way, it is possible to discharge solids with the conveyor screw in a simple and reliable manner.

The solids collecting space and the adjoining backwash chamber and subsequent chambers can be separated from one another by intermediate walls and sealing can be ensured by applying a vacuum in the backwash chamber and in the annular duct, so that leakage water can be sucked out externally around the spray chamber and the contact pressure force at the respective filter bed can be increased. Cleaning is accordingly achieved in a reliable and simple manner.

The filter bed can be deformed slightly so as to be sucked into the vacuum duct and backwash chamber due to the vacuum force. The solids layers can be lifted slightly by means of this deformation.

The solids collecting space and every chamber can have a sharp scraper edge on the outlet side. Solids can likewise be reliably lifted by this sharp scraper edge.

The spray chamber can be connected with the outside air via a pipe and liquid can be sprayed on the filter bed by the nozzles through this connection and the sprayed rinse water can flow out freely through the outlet. In this way, the spray water can flow freely out of the spray chamber in a simple manner after carrying out the cleaning process.

Sealing strips can be arranged at the shaft, at the outer edge and between the chambers in order to separate the chambers from one another and from the interior of the pressure vessel. The chambers are accordingly reliably sealed.

The filter beds can be produced from a microporous plastics mixture of different material having the same particle size. Filter beds with great fineness and strength are provided in this way.

The microporous filter plates can be produced from identical plastics material with at least two different particle sizes; Simple, dependable microporous filter plates can be provided in this way.

The filter beds can be produced from at least two different materials and at least two different particle sizes. Reliably acting filter beds can also be provided in this way.

The filter beds forming the outer sides of the filter disks can be sealed relative to the disk carders, shaft receiving tings and cover strips by U-shaped grooves extending circumferentially around the outer edge and by groove pressing strips inserted in the U-shaped grooves with pressing screws. The outer sides of the filter disks can accordingly be sealed in a reliable manner.

Two embodiment examples of the invention are shown in the drawings and described below.

BRIEF DESCRIPTION OF THE DRAWINGS

In the drawings:

FIG. 1 is a side view of a filter according to the invention for continuous filtration of liquids containing solids in a closed vessel;

FIG. 2 shows a section according to line II—II of FIG. 1;

FIG. 3 shows a section according to line III—III of FIG. 2;

FIG. 4 is a front view of the removal vessel in the direction of arrow IV;

FIG. 5 is a front view of a second embodiment form of the removal vessel;

FIG. 6 is a side view of the removal vessel;

DESCRIPTION OF THE PREFERRED EMBODIMENT

Figure 7:
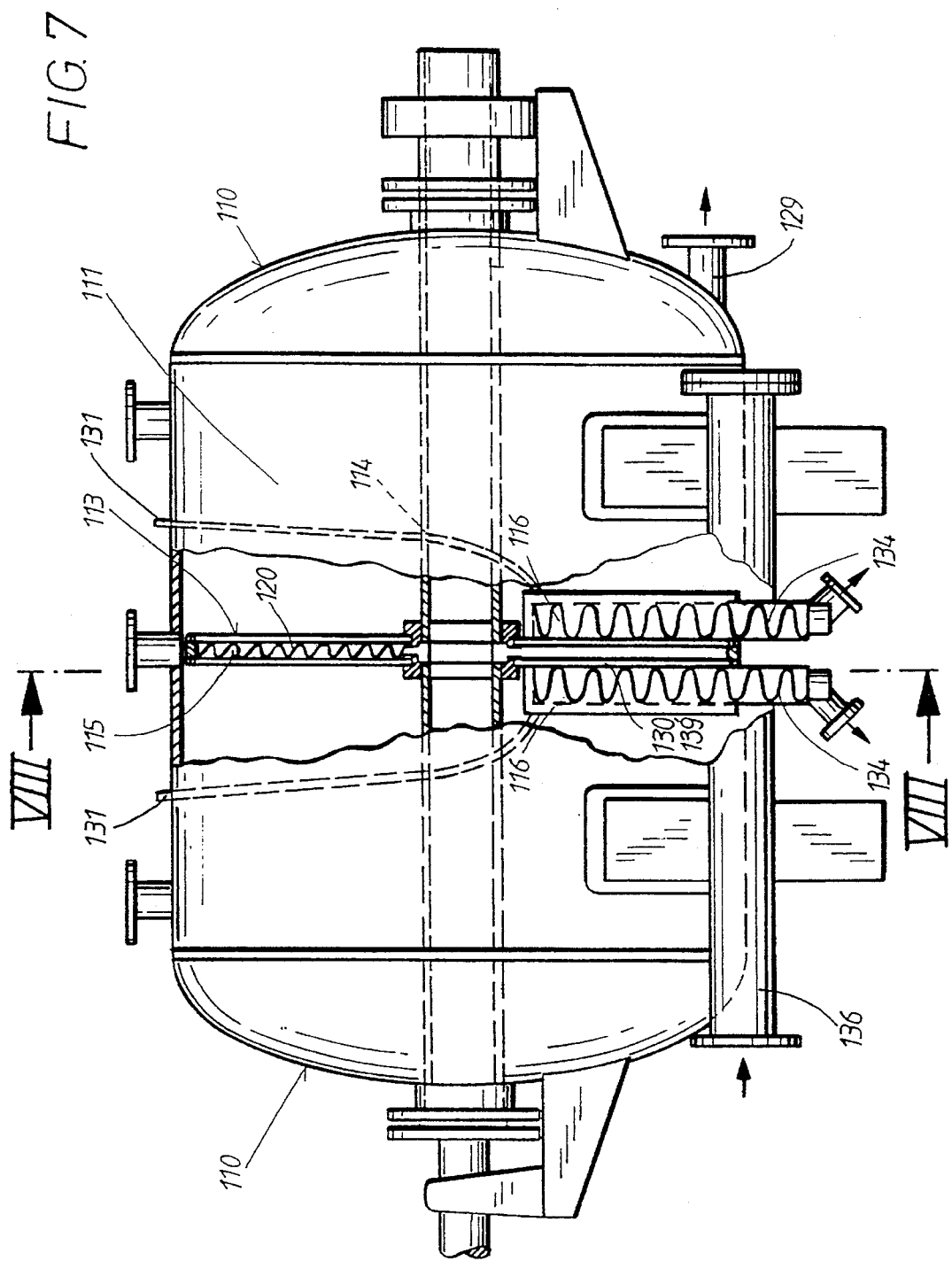
FIG. 7 shows a side view of a second embodiment form of the filters according to the invention for continuous filtration of liquids containing solids in a closed vessel.

The first filter device for continuous filtration of liquids containing solids which is shown in FIGS. 1 to 6 has a horizontal cylindrical vessel 11 which is closed by end plates 10 and is completely filled with the liquid to be filtered. There is a pressure difference between the liquid to be filtered and the filtrate. The pressure vessel 11 can have an inlet pressure of more than 10 bar. The vessel has a series of disks 13 formed by hollow filter sectors 12, these disks 13 being arranged at a distance from one another on a driven horizontal hollow shaft 14 normal to the shaft 14.

The disks 13, only one of which is shown in FIG. 1, have permeable filter beds on both sides of every filter sector 12 as will be described in the following. The hollow space 15 located between the latter allows the filtrate to flow out through the hollow shaft 14. Devices for removing and discharging solids from the filter beds forming the outer sides of the filter disks are provided on both sides of every filter disk 13 so as to press against the latter in a movable manner. These devices will be described in the following. Every device for removing and discharging solids from the filter beds is formed by a closed hollow box which is completely surrounded by the liquid to be filtered and contacts the respective filter bed so as to be sealed relative to it and has at least one inlet gap 17 comprehending the entire radius of the filter disk 13 in the region of contact as will be described in the following. Accordingly, the removal vessel formed by the box 16 serves to remove solids from the filter beds in a reliable manner with its inlet gap 17.

As will be seen particularly from FIG. 3, each filter bed formed by the outer sides 18 of the filter disk 13 has two plane, pressure-tight filter plates 19 with at least one filter layer with inner reciprocal supports 20 and microporous surfaces similar to a membrane filter. The plane, pressure-tight filter plate 19 is formed by a plate which is sintered from coarse supporting body material and has a filter fineness of 10 to 200 microns. The filter plate 19 can be produced from sintered polymer-plastic polyethylene, microporous polysulfone, microporous polypropylene, sintered metal/bronze powder or sintered stainless steel powder chips.

The plane, pressure-tight filter plate 19 can have at least one additional filter layer 21, preferably with a filter fineness between 0.5 and 50 microns, which is similar to a membrane filter and is sintered on. The additional applied filter layer 21 can be formed from metal-ceramic materials, silicon carbide, aluminum oxide, zirconium oxide and/or an additional microporous filter layer of polymeric plastics and carbon material. Further, it is also possible to produce the plane, pressure-tight layer filter plate 19 from composite-layer sieves, not shown in more detail, with coarse supporting body material and a filter layer similar to a membrane filter, preferably having a filter fineness of 0.5 to 50 microns, which is fixedly connected metallically by weld spot tacking.

It will also be seen from FIG. 3 that the supports 20 of the multiple-layer filter plate 19, 21 are formed along the entire surface area within the filtrate-outlet hollow space 15 of the disks 13 between the inner sides of two filter plates by pressure-tight spiral springs 20 which are preferably arranged in the circumferential direction of the disks 13.

As has already been explained, the disks 13 have hollow filter sectors 12 and the filter plates 19, 21 are inserted into carriers 22, covers 23 and shaft receiving rings 24. The carrier 22, cover 23 and shaft receiving ring 24 of every sector 12 have U-shaped grooves 25 in which the filter plates 19, 21 are inserted. Pressing strips 46 press against the filter plates 19, 21 in the U-shaped seals 25 by mechanical pressing. The filter plates 19, 21 can also be sealed in a manner not shown in more detail with the intermediary of rubber-elastic O-rings, not shown in detail. The mechanical pressing can also be applied eternally around every disk 13 by a clamping ring, not shown in more detail.

As will be seen from FIGS. 4, 5 and 6 in particular, the holding vessel 16 which extends radially along the outer side 18 of the filter disk so as to be pressed against it can have movably supported sealing and removing rollers 26 on the inlet side and, with a slight gap space 17 relative to the latter, resiliently supported scrapers 31 on the outlet side as well as sealing strips which are pressed against the outer sides 18 of the filter disk in a resilient manner, wherein movably pressed sealing strips 48 are also provided between the rear wall 47 and the removing rollers 26.

As will be seen in particular from FIGS. 4, 5 and 6, the sealing and removing roller 26 is held by two movable connection parts 27 which are formed by two spring plates. The spring plates are supported at the removal vessel 16 in a manner which is not shown in greater detail. As will be seen in particular from FIG. 5, a roller sealing strip 48 contacts the sealing and removing roller 26. This roller sealing strip 48 is likewise supported at a spring plate. Further, the side wall 29 of the removal box 16 tightly contacts the sealing and removing roller 26. The roller support 30 of the movable connection part 27 does not tightly contact the end face of the sealing and removing roller 26. As was already mentioned, the springing elastic supports for the conical roller 26 and for the scraper 31, which will be described in the following, and for the sealing strips 28 and 48 are constructed as leaf springs.

Solids collecting on the filter plates 19, 21 are pressed by the sealing and removing roller 26 supported in the removal vessel 16 and lifted from the outside 18 of the filter disk 19, 21. Liquid is accordingly removed from the solids cake 32 by pressing. The scraper 31 is provided for lifting the solids cake 32 so as to detach it from the outer sides 18 of the filter plates 19, 21 in a reliable manner. The scraper 31 can also be held by a leaf spring 35. A sealing strip 28 can also be provided at the scraper 31 on the outlet side by another leaf spring 45 in the manner described above. The scraper 31 can have a sharp front edge. In a manner not shown in more detail, the front edge of the scraper 31 can also be blunt.

A suction opening 33 is provided at the rear wall 47 of the removal vessel 16 of the construction shown in FIG. 5. Solids can be removed from the interior of the removal vessel 16 through this suction opening 33. The sealing force of all sealing elements can be adapted proportionally to every pressure change in the pressure vessel 11.

In the embodiment example shown in FIG. 4, a conveyor screw 34 is also arranged in proximity to and parallel to the surface 18 of the filter plates 19, 21 adjacent to the sealing and removing roller 26 in the holding vessel 16. The solids cake 32 can be removed from the outer sides 18 of the filter plates 19, 21 by means of this conveyor screw and guided outside the cylindrical vessel 11.

A scraper sealing strip 35 is connected with the vessel 16 behind the conveyor screw 34 and tightly contacts the filter surface 18. Accordingly, it is ensured in a simple manner that the solids cake 32 is removed in its entirety from the outer side 18 of the filter plate 19, 21.

The scraper sealing strip 35 can have a vacuum duct 36 to suck back the filtrate from the hollow space 15 of the disk for cleaning the filter plate 19, 21. The outer side 18 of the filter plate 19, 21 can accordingly be cleaned simply and dependably with this filtrate. The vacuum duct 36 can continue at the underside of the side walls 29 so that entering leakage water can be sucked out. In an adjoining spray chamber 50, the filter layer (21) can be further cleaned accompanied by ventilation (51), and rinse water can exit at the outlet 52.

As will be seen in particular from FIG. 4, a pressing shoe 37 can be arranged between the conical sealing and removing roller 26 and the conveyor screw 34 to press additional liquid out of the solids cake 32. The pressing shoe 37 can be swivelably supported on the inlet side and can have a compressed-air hose 38 on the outlet side for the purpose of pressing the pressing shoe against the solids cake 32. In addition, the pressing shoe 37 can have a series of openings 39 through which compressed air is admitted and which can act along the entire width of the solids cake 32 for the purpose of drying.

As was already explained, the cylindrical vessel should have the greatest possible number of disks arranged close to one another and parallel to one another on the central rotary shaft 14 so that the largest possible filter surface is provided in the pressure vessel 11. According to the invention, the pressure vessel 11 can have an inlet pressure of more than 10 bar. The plane filter surfaces are constructed as pressure-tight single-layer or multiple-layer filter plates 19, 21 with reciprocal inner supports 20 and form the pressure-tight coverings 19 on both sides of the filter disks 13. Spiral springs 20 are arranged along the entire surface in each disk sector 12 as pressure-tight spacers 20 for the filter plates 19, 21 in the filtrate-outlet hollow space 15. When small filters are used, one-part, two-part or quarter-circle sectors are provided as is shown in FIG. 2. In larger filters, eight sectors can also be arranged on each side of the disk 13. The U-shaped insertion grooves 25 are provided with additional, resiliently deformable seals. Every sector construction 12 is closed in a simple manner by an outer semicircular cover 23 which is screwed together with two sector supports concentrically to the shaft 14 and has two U-shaped insertion seals 25 which are preferably pressed against by clamping rings and clamping screws for sealing purposes. Pressing can also be applied to seals and to the edges of the filter plate 19 via pressing strips 46.

Solids 32 are precipitated out of the liquid flowing in under pressure on smooth microporous layer plate surfaces 18 and a pressure difference is adjusted in the hollow space 15 of the disk relative to the filtrate passing through.

The precipitated solids 32 are removed during rotation of the disks 13 in narrow removal boxes 16 which extend radially along the disk surface and contact each filter disk 13 by sealing surfaces.

On the inlet side, every hollow removal box 16 contains a conical sealing and removing roller 26 which is coated with soft rubber and is highly deformable under pressure. Walls 29, 47 which are connected with one another tightly adjoin the end sides of the roller 26 on the outlet side of the removal box 16 in such a way that movable connection parts such as leaf springs with attached sealing strips 28, 48 are so arranged between the rear wall and conical roller 26 and between rear wall 47 and filter plates 9, 21 that they are pressed against the conical roller 26 and the filter plate 19, 21 by the pressure of the vessel. This also presses the hollow space of the removal vessel 16 against the filter plate 19, 21, since a gap surface 17 is formed between the conical sealing roller 26 and scraper 31 at a slight pressure in the hollow space. Every removal vessel 16 is additionally pressed against the filter plate 19, 21 by adjustable spring force. The conical inlet roller 26 is suspended in movable beatings at the removal vessel 16 so that the roller 26 can be pressed away from the plate surface 18 against spring force when the cake 32 has a great thickness and the removal vessel 16 remains in tight contact.

The inlet sealing roller 26 moves the solids cake 32 into the removal vessel 16 in synchronous running with the rotation of the disk. In order to ensure the synchronous running, pin wheels 40 which are fastened on the neck of the conical roller 26 engage in pin grooves 41 at the outer circular sealing covers 23 of each disk 13 in such a way that the driver pins 40 and pin grooves 41 remain in engagement also when the cake has a great thickness.

The narrow removing gap 17 between the conical inlet roller 26 and the scraper 31 on the outlet side can also be used to backwash the filter plates 19, 21 at the same time that the precipitated solids are carried off.

Fluid, slimy solids can be sucked out of the removal vessels 16 by a pump via pipes. For filtering and removing moisture from large masses of mineral or fibrous solids with a large cake thickness and for high dry content, another embodiment form has a conveyor screw 34 arranged at the surface of the disk 18 radially to the shaft 14 inside the removal vessel 16 downstream of the inlet sealing roller 26 in such a way that the screw 34 moves the solids vertically downward out of the vessel 16.

In order to remove additional moisture from the solids cake 32, a pressing shoe 37 can tightly adjoin the conical sealing roller 26 within the removal vessel 16. This pressing shoe 37 is formed by a chamber with upper and rear stationary walls and front and lower movable walls, the lower wall being pressed against the solids cake 32 from the rear by a compressed-air hose 38. In addition, liquid still remaining in the cake is blown into the filter plates 19, 21 toward the filtrate by blowing compressed air through holes 39 in the lower wall. The movable front and lower walls are inclined relative to the cake which diminishes in thickness, so that this cake forms a self-sealing plug which is transported to the adjoining conveyor screw 34 by the subsequent cake and by means of the rotation of the disk 13. Sealing is effected at the rear end of the vessel 16 by a scraper sealing strip 35 which is preferably supported by a spring plate and has a sharp edge on the side of the screw 34 so as to form a scraper and is further improved so that the surface of the filter plates are cleaned off in an advantageous manner by the backwashing effect of filtrate sucked out of a vacuum duct 36 inside the wide scraper/sealing strip 35 at the outlet side of the removal vessel 16 and by the rinsing effect of a bundled inlet jet of the liquid to be filtered directed parallel to the filter plate surface from a flow-in gap 44 along the width of each filter plate. The vacuum duct 36 can extend into the side walls 29 and leakage water is sucked out. Additional cleaning of the filter layer 21 can be effected in a spray chamber 50 which has spray nozzles 49 and is provided with ventilation 51, the rinse water exiting the vessel through the outlet 52.

Every removal vessel 16 is supported at each disk side jointly with an inlet pipe at one side of the pressure vessel 11. The removal vessel 16 is inserted into a holder which in turn permits a precise contacting movement of the removal vessel 16 at the filter plate 19, 21 with the aid of spring force and can be guided in addition on the shaft 14 in a sliding beating.

The second filter device for continuous filtration of liquids containing solids which is shown in FIGS. 7 to 10 has a horizontal cylindrical vessel 111 which is closed by end plates 110 and is completely filled with the liquid to be filtered. There is a pressure difference between the liquid to be filtered and the filtrate. The pressure vessel 111 can have an inlet pressure of more than 10 bar. The vessel has a series of disks 113 formed by hollow filter sectors 112, these disks 113 being arranged at a distance from one another on a driven horizontal hollow shaft 114 normal to the shaft 114.

The disks 113, only one of which is shown in FIG. 7, have filter beds 121 on both sides of every filter sector 112 as will be described in the following. The hollow space 115 located between the latter allows the filtrate to flow out through the hollow shaft 114. Stationary devices for removing and discharging solids from the filter beds 121 forming the outer sides 118 of the filter disks are provided on both sides of every filter disk 113 as will be described in the following. Every device 116 for removing and discharging solids from the filter beds 121 is formed by a closed hollow box which is completely surrounded by the liquid to be filtered and contacts the respective filter bed 121 so as to be sealed relative to it and has at least one inlet gap 117 comprehending the entire radius of the filter disk 113 in the region of contact as will be described in the following. Accordingly, the removal vessel formed by the box 116 serves to remove solids from the filter beds 121 in a reliable manner with its inlet gap 117.

Figure 10:
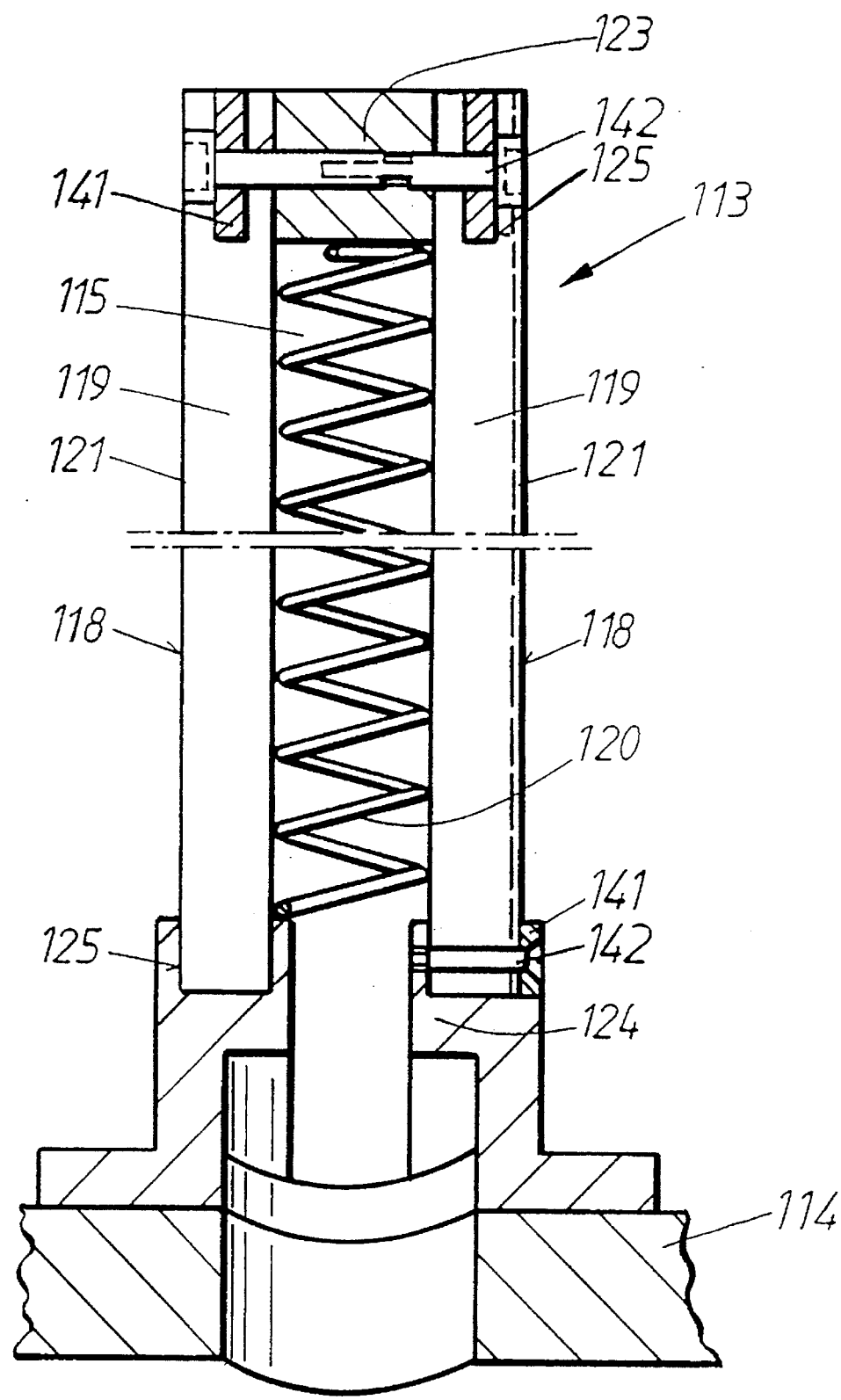
FIG. 10 shows a section according to line X—X of FIG. 8.

As will be seen particularly from FIG. 10, the filter beds formed by the outer sides 118 of the filter disks 113 have two plane, pressure-tight filter plates 119 with at least one filter layer with inner reciprocal supports 120 and microporous surfaces similar to a membrane filter. The plane, pressure-tight filter plate 119 is formed by a plate which is sintered from coarse supporting body material and has a filter fineness of roughly 10 to 200 microns. The filter plate 119 can be produced from sintered microporous polymeric plastics, sintered metal powder and can have a layer of metal-ceramic material in addition.

The plane, pressure-tight filter plate 119 can have at least one additional filter layer 121, preferably with a filter fineness between 0.5 and 50 microns, which is similar to a membrane filter and is sintered on. The additional sintered filter layer 121 can be formed from metal-ceramic material and/or can have a microporous filter layer of polymeric plastics and carbon material. Further, it is also possible to produce the plane, pressure-tight layer filter plate 119 from composite-layer sieves, not shown in more detail, with coarse supporting body material and a filter layer similar to a membrane filter, preferably having a filter fineness of 0.5 to 50 microns, which is fixedly connected metallically by weld spot tacking.

It will also be seen from FIG. 10 that the supports 120 of the multiple-layer filter plate 119, 121 are formed along the entire surface area within the filtrate-outlet hollow space 115 of the disks 113 between the inner sides of two filter plates by pressure-tight spiral springs which are preferably arranged in the circumferential direction of the disks 113.

As has already been explained, the disks 113 have hollow filter sectors 112 and the filter plates 119, 121 are inserted on carriers 122, covers 123 and in shaft receiving rings 124. The shaft receiving rings 124 of every sector 112 have U-shaped grooves 125 in which the filter plates 119, 121 are inserted. The filter plates 119, 121 are forced with pressure-tight contact pressure against the cover strips 123 at both sides via pressing strips 141 in circumferentially extending circumferential slots 125 by mechanical pressing with pressing screws 142.

Figure 8:
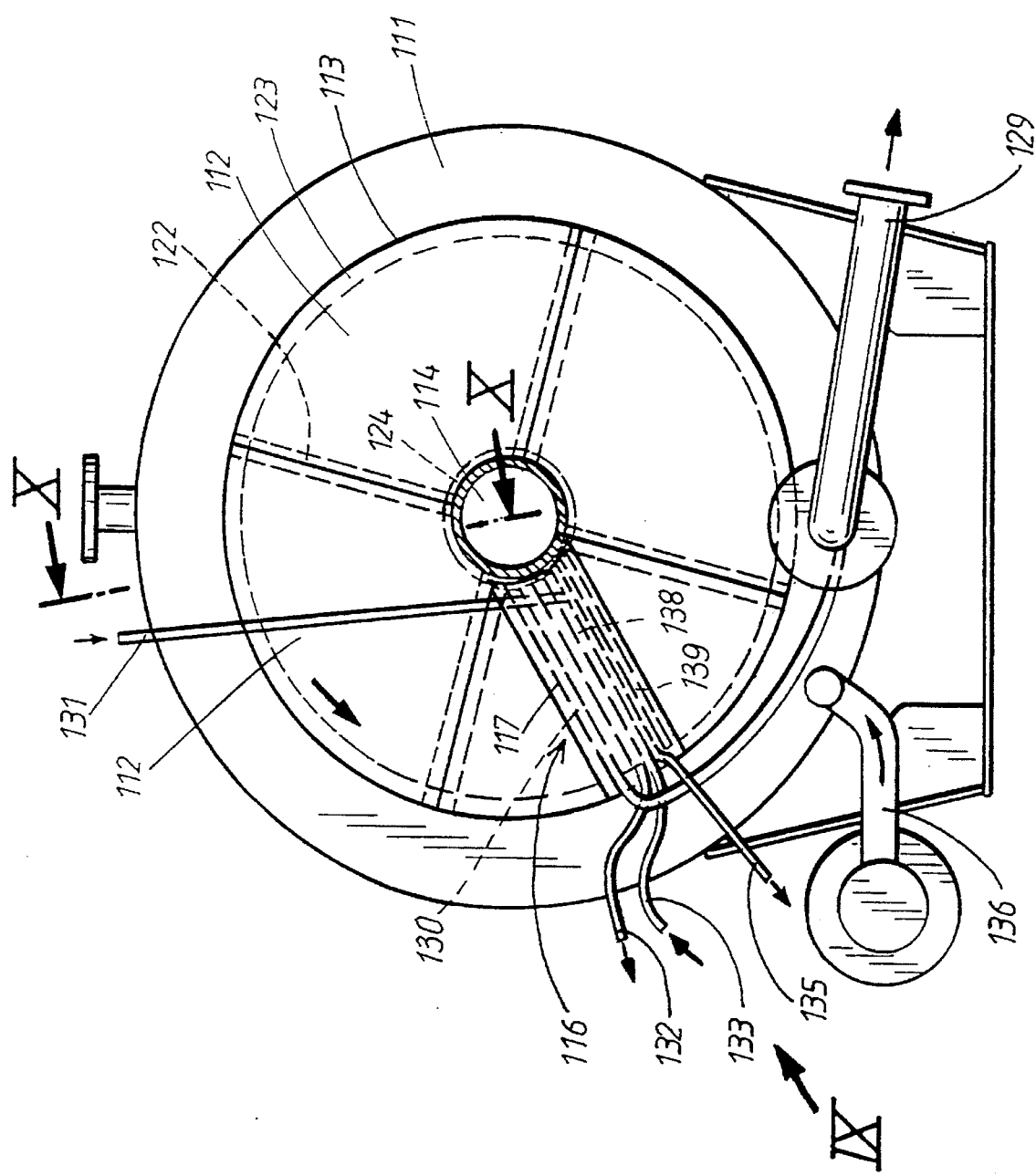
FIG. 8 shows a section through line VIII—VIII of FIG. 7.

The cylindrical vessel 111 should have the greatest possible number of disks 113 arranged close to one another and parallel to one another on the central hollow shaft 114 so that the largest possible filter surface is provided in the pressure vessel 111. According to the invention, the pressure vessel 111 can have an inlet pressure of more than 10 bar. The plane filter surfaces are constructed as pressure-tight single-layer or multiple-layer filter plates 119, 121 with reciprocal inner supports 120 and form the pressure-tight coverings 119 on both sides of the filter disks 113. Spiral springs 120 are arranged along the entire surface in each disk sector 112 as pressure-tight spacers 120 for the filter plates 119, 121 in the hollow filtrate-outlet space 115. When small filters are used, full-circle, half-circle or quarter-circle sectors are provided as is shown in FIG. 8. In larger filters, eight sectors can also be arranged on each disk side 113. Every sector construction 112 is closed relative to the filter plates 119 in a simple manner by an outer semicircular cover 123 which is connected with two sector supports concentrically to the shaft 114, these filter plates 119 preferably being pressed against by pressing strips 141 and clamping screws 142 for sealing purposes. Thus, pressure is applied to the cover 123 and the edges of the filter plates 119 via pressing strips 141.

The precipitation of solids from the liquid flowing in under pressure is effected on the smooth microporous surfaces 118 similar to membrane filters and a pressure difference is adjusted in the hollow space 115 of the disk relative to the filtrate passing through.

The precipitated solids are removed during motor-actuated rotation of the disks 113 in narrow removal boxes 116 which extend radially along the disk surfaces and contact each filter disk 113 by sealing surfaces 140.

The devices 116 extending radially over the outer sides 118 of the filter disks on both sides of every filter disk 113 serve to remove and discharge solids from the filter beds 119, 121. The devices are formed by a box device with at least one chamber which is sealed relative to the filter beds 119, 121 and can be pressed by spring force against microporous metallic or plastics material comprising at least one type of material and at least one particle size mixture. The filter beds 119, 121 are constructed as circle segments 112 and can be pressed tightly against cover strips 123 and disk carriers 122 and shaft receiving rings 124 with circumferential U-shaped slot seals 125 by means of pressing strips 141 fastened by screws. The solids are removed from the filter disks 113 in a reliable manner in this way.

Figure 9:
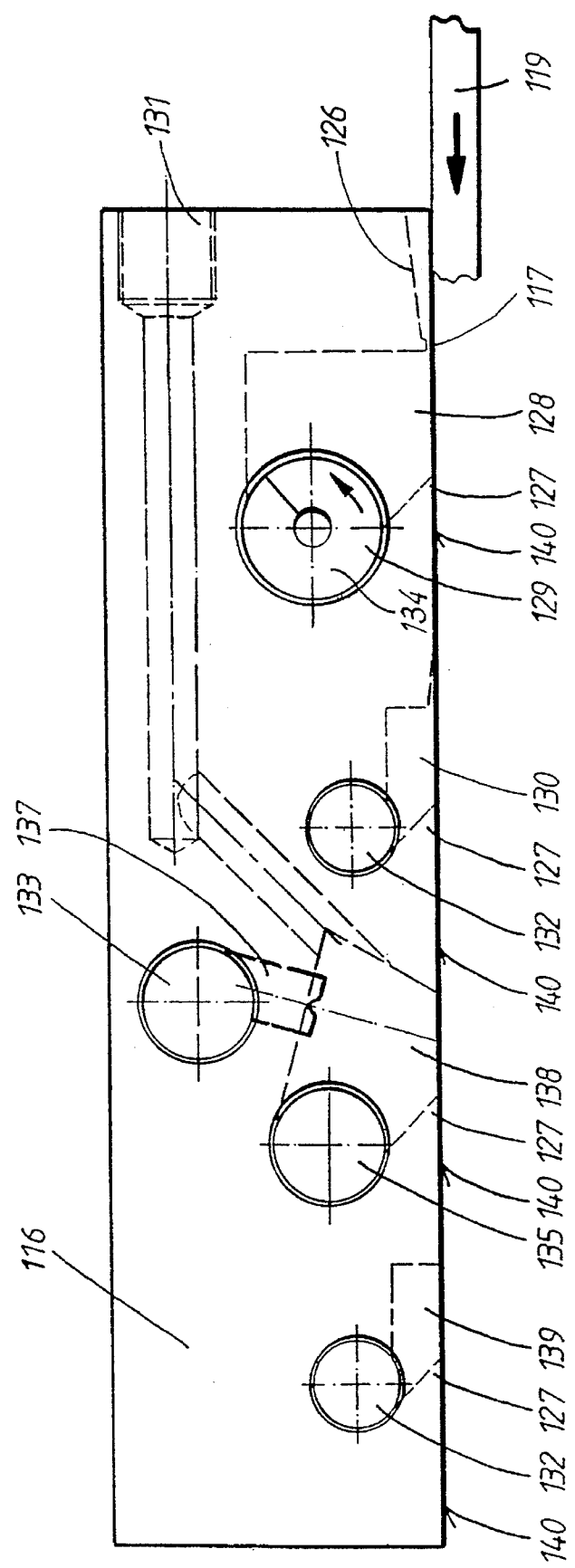
FIG. 9 shows a front view of the removal box as seen in the direction of the arrow IX shown in FIG. 8.

As can be seen in particular in FIG. 9, the box unit 116 has a slanting front wall 126 on the inlet side with a gap opening 117 leading to the adjoining solids collecting space 128 from which solids can be discharged by a conveyor screw 134. Intermediate walls, not shown in more detail, separate the solids collecting space 128 and the adjoining backwash chamber 130 and the subsequent spray chamber 138. The sealing of the sealing strips 140 relative to the filter plate 119 is effected by applying a vacuum in the backwash chamber 130 and in the vacuum duct 139, and leakage water can be sucked out externally around the spray chamber 138. The contact pressure force of the sealing strip 140 at the respective filter bed 119, 121 is increased by means of this vacuum. The filter bed 119, 121 can be deformed slightly so as to be sucked into the backwash chamber 130 due to the vacuum force.

The solids collecting space and every chamber can have a sharp scraper edge 127 on the outlet side for additional sealing. Naturally, this scraper edge also serves at the same time to clean the outer sides 118 of the filter beds 119, 121.

The spray chamber 138 can be connected with the outside air via a pipe 131 and the sprayed rinse water can flow out freely through the outlet 135.

Sealing strips 140 can be arranged at the hollow shaft 114, at the outer edge and between the chambers in order to separate the chambers from one another and from the interior of the pressure vessel. The box devices 116 with at least one chamber which is sealed relative to the filter bed 119, 121 can be produced from plastic. In other constructions, the box unit 116 with at least one chamber sealed relative to the filter bed 119, 121 can be produced from metal.

The filter beds 119, 121 can be produced from a microporous plastics mixture of different material having the same particle size. The microporous filter plates 119, 121 can also be produced from identical plastics material with at least two different particle sizes. Further, the filter beds 119, 121 can also be produced from at least two different materials and at least two different particle sizes.

The filter beds 119, 121 forming the outer sides 118 of the filter disks can be sealed relative to the disk carrier 122, cover strip 123 and shaft receiving rings 124 with a circumferential groove pressing strip 141 by pressing screws 142. The circumferential sealing groove 125 at the outer edge of each plate 119, 121 can be arranged at the filter bed so as to extend circumferentially in the center to receive the insertable pressing strip 141.

The screws 142 can be arranged in such a way that the screw heads are countersunk in the filter material remaining in front of the pressing strip 141 and the pressing force can be transmitted through the stable and rigid pressing strip 141 to the inner web and against the disk carrier 122 and cover strips 123 for a complete sealing.

As will be seen from FIG. 8 in particular, inlet distributing pipes 136 are provided at the cylindrical vessel 111 to introduce the liquid into the cylindrical vessel 111. The solids are sucked out through the pipe 129. Spray water is introduced through the chamber 138 by spray nozzles 137 to clean the filter beds 119, 121 and ventilation 131 is provided for the spray chamber 138. A vacuum connection 132 is provided at the spray chamber 139. A rinse water outlet 135 is also provided at the spray chamber 138, while the spray water is introduced through nozzles 137.

As was already mentioned, the constructions shown in the drawings are only examples of realizations of the invention and the invention is not limited to these examples. On the contrary, many other constructions and modifications are possible without departing from the spirit and scope of the invention.

What is claimed is:

1. In a filter for continuous filtration of liquids containing solids in a closed cylindrical vessel with filter disks which are formed by a plurality of hollow filter sectors and supported at a distance from one another on a horizontal hollow shaft normal to the shaft, with filter plates on both sides of every filter sector and a hollow space located between the filter plates allowing the filtrate to flow out through the hollow shaft, and with devices which are disposed along both sides of every filter disk for removing and discharging solids from filter plates forming outer sides of the filter disks and for cleaning these filter plates, wherein every device for removing and discharging solids from and cleaning the filter plates is formed by a closed hollow box unit which is completely surrounded by the liquid to be filtered and has a plurality of chambers which are separated from one another, wherein every chamber has at least one inlet gap extending over the entire radius of the filter disk and at least one of the chambers contacts the respective filter plate so as to be sealed relative to it, the improvement comprising that:

support means in the hollow space of each said filter sector engaging inner sides of the filter plates;

wherein said filter plates are formed of a sintered microporous material;

wherein the filter plates of each sector include an outer circumferential edge, a radially inner circumferential edge, and a pair of space apart radial edges, a cover disposed between the filter plates along the outer circumferential edges thereof, wherein said cover is concentrically connected to said shaft with a pair of sector supports which are disposed between the filter plates along the respective radial edges thereof, said outer circumferential edges and said radial edges including slots formed therein with first pressing strips disposed in said slots, a first plurality of fastening screws extending through said filter plates, first pressing strips, and cover for sealingly clamping said filter plates against said cover, a second plurality of screws extending through said filter plates, first pressing strips, and sector supports for sealingly clamping said filter plates against said sector supports, a pair of shaft receiving rings connected to said shaft and sealingly receiving the respective inner circumferential edges of said filter plates, second pressing strips arranged on the outer surface of said filter plates along the inner circumferential edges thereof for sealingly pressing said filter plates against the respective shaft receiving rings, and a third plurality of screws extending through said second pressing strips and filter plates for sealingly holding said filter plates against said shaft receiving rings;

wherein each said chamber defines a scraper for scraping solids from outer surfaces of said filter plates;

sealing strips disposed on said box units between adjacent said chambers and contacting said filter plates for sealing each said chamber from an adjacent said chamber;

wherein each said box unit extends radially along outer sides of the respective filter disk and has front wall slanted with respect to an adjacent filter plate down to a gap opening located as an inlet to a solids collecting space defined by one of said chambers the respective box unit;

wherein one of said chambers is a spray chamber, means for ventilating said spray chamber including a pipe connecting the spray chamber to the outside atmosphere, said spray chamber further including spray nozzles for directing rise water against said filter plate and means for defining a rinse water outlet;

wherein one of said chambers is a backwash chamber disposed adjacent an upstream side of said spray chamber;

wherein one of said chambers is a vacuum duct disposed adjacent a downstream side of said spray chamber; and, means for connecting a vacuum source to said backwash chamber and said vacuum duct, whereby a vacuum within said backwash chamber and said vacuum duct forces said sealing strips against the respective filter plate to seal said spray chamber from a surrounding pressurized suspension in the filter vessel.

2. The filter according to claim 1, wherein the filter plates are formed of a sintered polymeric plastic material and have a porosity of 0.5 to 200 microns.

3. The filter according to claim 2, wherein the filter plate comprises a sintered microporous surface having a porosity of 0.5 to 200 microns and a coarse supporting body having a porosity of 10 to 200 microns.

4. The filter according to claim 1, wherein the filter plates are formed of a sintered metal powder material and have a porosity of 0.5 to 200 microns.

5. The filter according to claim 2, wherein the filter plate comprises a microporous sintered surface having a porosity of 0.5 to 200 microns and a coarse supporting body having a porosity of 10 to 200 microns.

6. The filter according to claim 1, wherein the filter plate has at its outer side at least one additional ceramic filter layer supported on a ground porous metal layer, wherein said filter layer has a porosity of between 0.05 and 50 microns.

7. The filter according to claim 1, wherein the filter plate has at the outer side at least one additional microporous filter layer of polymeric plastic having a porosity of between 0.05 and 50 microns.

8. The filter according to claim 1, wherein the plane, pressure-tight filter plate is produced from composite-layer sieves with coarse supporting body material and a filter layer having a porosity of 0.5 and 50 microns.

9. The filter according to claim 1, wherein the filter plates are provided over the entire surface area within the hollow spaces of the disks between two inwardly facing sides of the filter plates with pressure-resistant spiral springs which are arranged relative to one another at respective staggered angles in the circumferential direction of the disks.

10. The filter according to claim 1, wherein a conveyor screw for discharging solids is disposed inside the solid collecting space, said conveyor being arranged in proximity to an parallel to the outer side of the respective filter plate.

11. The filter according to claim 1, wherein the filter bed is deformed slightly so as to be sucked into the vacuum duct and backwash chamber due to the vacuum force.

12. The filter according to claim 1, wherein the filter beds are produced from a microporous plastics mixture of different material having the same particle size.

13. The filter according to claim 1, wherein the microporous filter plates are produced from identical plastics material with at least two different particle sizes.

14. The filter according to claim 1, wherein the filter beds are produced from at least two different materials and at least two different particle sizes.

* * * * *